United States Patent Office 2,731,476
Patented Jan. 17, 1956

2,731,476

SULFONIC ACID AMIDES OF THE ANTHRAQUINONE SERIES

Albin Peter, Binningen, and Erhard Wydler, Basel, Switzerland, assignors to Sandoz A. G., Basel, Switzerland, a Swiss firm No Drawing. Application October 6, 1952, Serial No. 313,348

Claims priority, application Switzerland October 18, 1951

6 Claims. (Cl. 260—371)

The present invention relates to sulfonic acid amides of the anthraquinone series and to the preparation thereof. More particularly, the invention has especial relation to the group of sulfonic acid amides which correspond to the formula

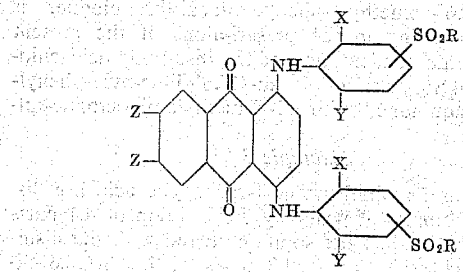

wherein each Q and Y stands for methyl or ethyl, Z stands for H, Cl or Br, and R is the radical of an amine, and wherein each phenyl nucleus may be further substituted by methyl, ethyl, chlorine or bromine, provided however that not more than one halogen atom may be present on each phenyl nucleus.

The compounds of the present invention may be prepared by condensing the corresponding sulfonic acid chlorides of the formula

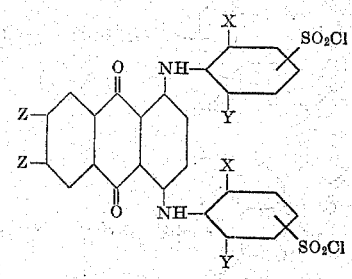

wherein X, Y and Z have the precedingly-recited significances and the precedingly-indicated proviso applies, with amines.

Suitable starting compounds for the preparation of the sulfonic acid amides of the present invention comprise for example the sulfonic acid chlorides of the following:

1,4 - di - (2',6' - dimethyl) - phenylaminoanthraquinone,
1,4 - di - (2',4',6' - trimethyl) - phenylaminoanthraquinone,
1,4 - di - (2',3',4',6' - tetramethyl) - phenylaminoanthraquinone,
1,4 - di - (2',4',6' - triethyl) - phenylaminoanthraquinone,
1,4 - di - (2',4' - dimethyl - 6' - ethyl) - phenylaminoanthraquinone,
1,4 - di - (2',4',6' - trimethyl - 3' - bromo) - phenylaminoanthraquinone,
1,4 - di - (2',4',6' - trimethyl - 3' - chloro) - phenylaminoanthraquinone,
1,4 - di - (2',6' - dimethyl) - phenylamino - 6 - chloro - anthraquinone,
1,4 - di - (2',6' - dimethyl) - phenylamino - 6,7 - dichloro - anthraquinone, etc.

The said sulfonic acid chlorides can be prepared, for example, by the action of chlorosulfonic acid on the corresponding 1,4 - diarylaminoanthraquinone until the resultant compounds have become soluble in hot dilute alkali metal hydroxide solution, but are still insoluble in water. The starting material is preferably added, while stirring at —10° C. to 100° C., to the chlorosulfonic and the stirring continued until the indicated point is reached. Then the reaction product is poured onto ice or onto a mixture of ice and water or salt water, and the formed precipitate filtered off and washed. The product may be used as a moist paste, but if desired it may be dehydrated by careful drying, preferably under reduced pressure and at a low temperature (e. g. 20° C.).

Suitable amines for use in preparing the sulfonic acid amides of the present invention comprise ammonia and its derivatives resulting from the replacement of one or two hydrogen atoms by alkyl, oxalkyl, cycloalkyl or aryl, for example: methylamine, ethylamine, diethylamine, amylamine, ethanolamine, diethanolamine, propanolamine, piperidine, taurine, N-methyltaurine, aminobenzene, amino-methylbenzenes, amino-dimethylbenzenes, amino-methoxybenzenes, amino-ethoxybenzenes, amino-dimethylbenzenesulfonic acids, amino-methoxybenzenesulfonic acids, N - (aminophenyl) - aminobenzenesulfonic acids, aminonaphthalenesulfonic acids, (3' - amino - 4' - methoxy) - phenylmethanesulfonic acid, (3' - amino - 4',6' - dimethyl) - phenylmethanesulfonic acid, etc.

To effect the condensation, the sulfonic acid chlorides may be stirred, dry or in the form of wet press cakes, with the amines. As solvent or diluent, when these are employed, use is made when possible of the amine itself; otherwise water, or alcohols, such as methyl alcohol, ethyl alcohol or propyl alcohols, or ketones, such as acetone or methylethylketone, or mixtures, such as aqueous alcohol, may be used. The condensation takes place at ordinary (20–30° C.) or slightly raised temperature; in some cases, it may be desirable to heat to about 80–100° C. to drive the condensation to completion.

The liberated hydrochloric acid may be bound by an excess of the amine being condensed or by an acid-binding agent, such as sodium carbonate, sodium bicarbonate or the carbonates of lithium and potassium.

The sulfonic acid amides are separated from the reaction mixture by dilution with water, salt water or dilute hydrochloric or sulfuric acid—depending upon whether the sulfonic acid amide is water-soluble or water-insoluble, and depending upon the nature of the diluent—and filtration. In some cases, the entire reaction mixture may be dried.

The products of the condensation are generally disulfonic acid amides corresponding to the disulfonic acid chlorides.

Insofar as the sulfonic acid amides have no sulfonic acid groups, they are useful as pigments and for coloring lacquers and plastic masses. The water-soluble sulfonic acid amides are valuable blue dyestuffs for the dyeing of animal fibers, such as wool, silk, tussah, etc. and of synthetic fibers, such as nylon. The dyeings on wool, in particular, are distinguished by very good fastness to fulling and light.

The following examples are illustrative—but not restrictive—of the invention. Thus, the particular amines therein employed may be replaced by equivalent quantities of a wide variety of other amines such as those hereinbefore enumerated, similar products being obtained. The parts in the examples are parts by weight, percentages are percentages by weight, and temperatures are degrees centigrade.

*Example 1*

334 parts of a 20% moist paste of the disulfonic acid chloride of 1,4-di-(2',4',6'-trimethyl)-phenylaminoanthraquinone are stirred with 180 parts of a 20% aqueous solution of the sodium salt of 2-aminoethane-sulfonic acid. After the addition of 20 parts of sodium bicarbonate and 100 parts of 80% isopropyl alcohol, stirring is carried out for 3 hours at 50°, the reaction mixture becoming water-soluble. Stirring is then continued for two more hours at 80° under reflux, then 80 parts of sodium chloride are added and the stirring continued cold. The mixture is filtered, and the residue washed neutral with 10% aqueous sodium chloride solution and then dried. The thus-obtained dyestuff, which corresponds to the formula

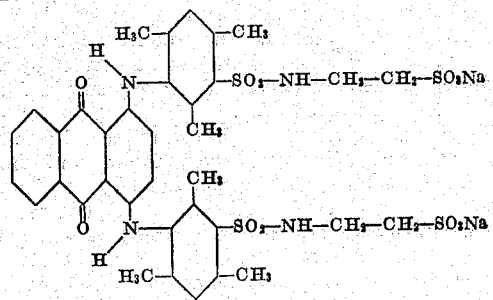

dyes wool, silk and nylon in vivid reddish blue shades of good fastness to fulling and to light.

By replacing the disulfonic acid chloride paste of the present example by the disulfonic acid chloride from 50.2 parts of 1,4-di-(2',4'-dimethyl-6'-ethyl)-phenylaminoanthraquinone, and otherwise proceeding as described in the preceding paragraph, another reddish blue dyestuff which is fast to fulling is obtained.

The disulfonic acid chloride from 55.8 parts of 1,4-di-(2',4',6'-triethyl)-phenylaminoanthraquinone in like manner yields a red-blue wool dyestuff which is fast to fulling and to light.

Similarly, if the disulfonic acid chloride of 1,4-di-(2',4',6'-trimethyl)-phenylaminoanthraquinone is replaced by the disulfochloride from 44.6 parts of 1,4-di-(2',6'-dimethyl)-phenylaminoanthraquinone, there is obtained a more reddish blue dyestuff with similar properties.

If use is made of the disulfonic acid chloride from 51.5 parts of 1,4-di-(2',6'-dimethyl)-phenylamino-6,7-dichloro-anthraquinone, a pure blue dyestuff for wool, silk and nylon is obtained.

Likewise, with the disulfonic acid chloride from 50.2 parts of 1,4-di-(2',3',4',6'-tetramethyl)-phenylaminoanthraquinone, there is also obtained a dyestuff which dyes wool, silk and nylon in pure blue shades with excellent wet- and light-fastness properties.

*Example 2*

120 parts of a 30% solution of the sodium salt of 2-N-methylaminoethane-sulfonic acid are stirred with 318 parts of 21% moist disulfonic acid chloride of 1,4-di-(2',4',6'-trimethyl)-phenylaminoanthraquinone, then 80 parts of isopropyl alcohol and 20 parts of sodium bicarbonate are added, and the mixture stirred on the water-bath for 5 hours at 50°. The reaction mixture is then neutralized with 6 parts of concentrated hydrochloric acid and then, after the addition of 37 parts of sodium chloride, the isopropyl alcohol is distilled off. The remainder is then filtered at 50°, and the residue washed with 5% aqueous sodium chloride solution and then dried at 110°. A dyestuff is obtained which corresponds to the formula

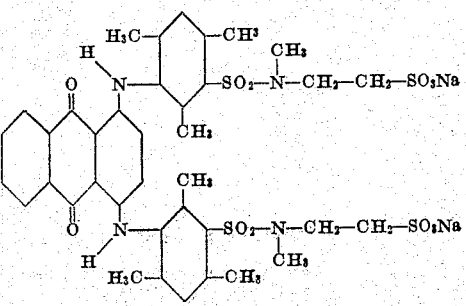

and which dyes wool, nylon and silk in vivid reddish blue shades of very good fastness to fulling and to light.

Similar reddish blue dyestuffs of good wet-fastness and light-fastness properties are obtained when, while otherwise proceeding as described in the preceding paragraph, the disulfonic acid chloride is replaced by the disulfonic acid chloride from 50.2 parts of 1,4-di-(2',4'-dimethyl-6'-ethyl)-phenylaminoanthraquinone or from 55.8 parts of 1,4-di-(2',4',6'-triethyl)-phenylaminoanthraquinone.

A dyestuff which has the same properties as, but which dyes wool in more reddish blue shades than the condensation product from the disulfonic acid chloride of 1,4-di-(2',4',6'-trimethyl)-phenylaminoanthraquinone, is obtained according to the prescriptions of the present example by the condensation of the disulfonic acid chloride from 44.6 parts of 1,4-di-(2',6'-dimethyl)-phenylaminoanthraquinone with 2-N-methylaminoethane-sulfonic acid.

*Example 3*

14 parts of 3-aminobenzene-1-carboxylic acid are dissolved in 100 parts of water by the addition of 4.1 parts of sodium hydroxide, the solution stirred with the disulfonic acid chloride from 22.3 parts of 1,4-di-(2',6'-dimethyl)-phenylaminoanthraquinone, and then 6.5 parts of sodium carbonate added thereto. After stirring for 12 hours at 40°, the reaction product is completely soluble in cold water. It is precipitated at 90° with 15% aqueous sodium chloride solution, the precipitated dyestuff forthwith filtered off with suction and then washed neutral with 10% aqueous sodium chloride solution. The thus-obtained dyestuff, which corresponds to the formula

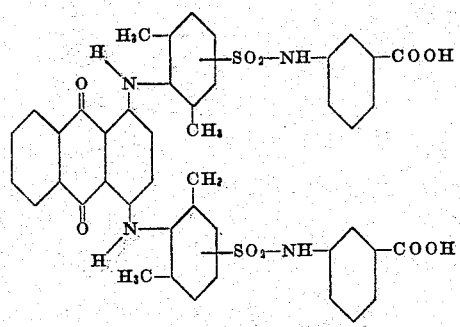

dyes wool in pure reddish blue shades of good wet-fastness and light fastness properties.

By replacing the disulfonic acid chloride of 1,4-di-(2',6'-dimethyl)-phenylaminoanthraquinone, in the preceding paragraph, by the corresponding derivative from 23.7 parts of 1,4-di-(2',4',6'-trimethyl)-phenylaminoanthraquinone, a product is obtained which dyes wool in pure blue shades with similar fastness properties.

A likewise similar dyestuff is obtained, according to the prescriptions of this example, when the disulfonic acid chloride from 23.7 parts of 1,4-di-(2',4',6'-trimethyl)-phenylaminoanthraquinone is condensed with 14 parts of 4-aminobenzene-1-carboxylic acid (replacing the like quantity of 3-aminobenzene-1-carboxylic acid specified in the first paragraph of the example).

Example 4

The moist disulfonic acid chloride from 23.7 parts of 1,4-di-(2',4',6'-trimethyl)-phenylaminoanthraquinone is stirred with 100 parts of 10% aqueous sodium sulfate solution, and 10 parts of anhydrous sodium carbonate are added. Then, at 50°, a concentrated aqueous solution of the sodium salt of 17 parts of 4-amino-2-hydroxybenzene-1-carboxylic acid is added dropwise in a period of 1 hour, and then the whole mixture is stirred for 15 more hours. The formed dyestuff is precipitated at 90° by the addition of 25 parts of sodium chloride, and then filtered off cold and washed with 10% aqueous sodium chloride solution. The thus-obtained dyestuff, which corresponds to the formula

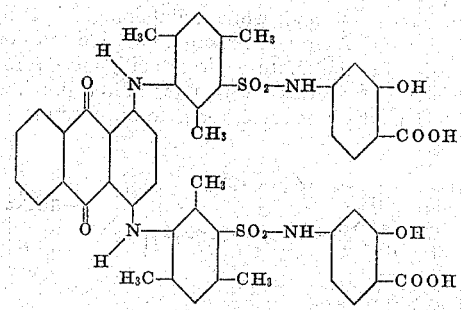

dyes wool, silk and nylon in pure blue shades which are distinguished by good fastness to light and by very good wet-fastness properties.

A somewhat more greenish dyestuff is obtained when, while otherwise proceeding as described in the preceding paragraph the disulfonic acid chloride from 23.7 parts of 1,4-di-(2',4',6'-trimethyl)-phenylaminoanthraquinone are replaced by the disulfonic acid chloride from 25.4 parts of 1,4-di-(2',4',6'-trimethyl) - phenylamino-6-chloro-anthraquinone or from 27.6 parts of 1,4-di-(2',4',6'-trimethyl)-phenylamino-6-bromo-anthraquinone.

Example 5

Into a suspension of 26.5 parts of the sodium salt of 1,3-dimethyl-4-aminobenzene-6-sulfonic acid, 12 parts of sodium bicarbonate and 12 parts of sodium chloride in 100 parts of water, there is added in small portions within a period of 1 hour and at 55–60° a moist disulfonic acid chloride paste from 27.2 parts of 1,4-di-(2',4',6'-trimethyl)-phenylamino-6,7-dichloro-anthraquinone, and then the mixture is stirred for 36 more hours until complete solubility in 1% aqueous sodium carbonate solution is achieved. The reaction product is precipitated by the addition of an additional 12 parts of sodium chloride and, after isolation, the product, which corresponds to the formula

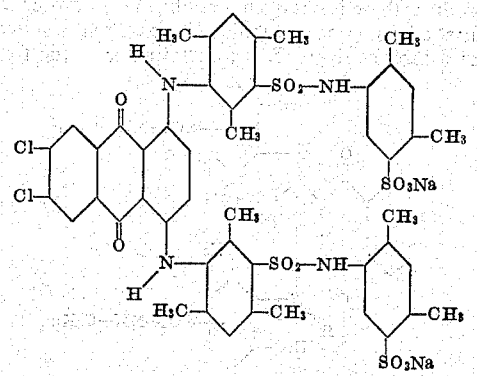

is a dyestuff which dyes wool in greenish blue shades with good fastness to fulling and to light.

Example 6

10 parts of 1,3-dimethyl-4-aminobenzene-5-sulfonic acid are dissolved in such quantity of dilute aqueous sodium hydroxide solution that the resulting solution has a weak alkaline reaction. 25.2 parts of crystalline sodium sulfate and 4.3 parts of sodium bicarbonate are then added and the whole is stirred with a moist paste of the disulfonic acid chloride from 9 parts of 1,4-di-(2',4',6'-trimethyl)-phenylaminoanthraquinone. The reaction mass is diluted with 40 parts of water and is then stirred for 20 hours at 50° until complete solubility in cold water is achieved. Then, after keeping the mixture for 1 hour at 80°, precipitation is effected with 15.4 parts of sodium chloride. After working up the mixture as in the preceding examples, there is obtained a blue wool dyestuff with good fastness to fulling and to light, and which corresponds to the formula

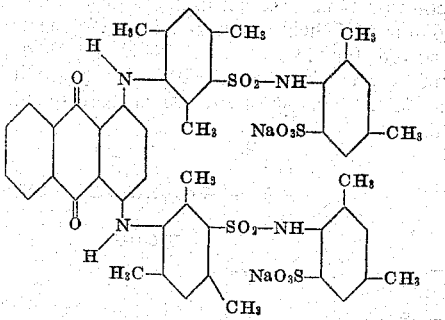

If, in the preceding paragraph, there is used instead of the disulfonic acid chloride from 1,4-di-(2',4',6'-trimethyl)-phenylaminoanthraquinone, the disulfonic acid chloride from 8.5 parts of 1,4-di-(2',6'-dimethyl)-phenylaminoanthraquinone, there is likewise obtained a blue dyestuff, of good fastness to fulling and to light, for wool, silk and nylon.

A dyestuff, of good wet-fastness and light fastness, is also obtained by the condensation, according to the prescriptions of the present example, of the disulfonic acid chloride from 10.6 parts of 1,4-di-(2',4',6'-triethyl)-phenylaminoanthraquinone with 1,3-dimethyl-4-aminobenzene-5-sulfonic acid.

Example 7

To 100 parts of water, there are successively added 22.5 parts of 30% aqueous sodium hydroxde solution, 45 parts of 1-methoxy-2-aminobenzene-4-sulfonic acid, 18 parts of sodium bicarbonate and 100 parts of isopropyl alcohol. Then, while stirring, the moist disulfonic acid chloride from 47.4 parts of 1,4-di-(2',4',6'-trimethyl)-phenylaminoanthraquinone is added, and the mixture kept on the water-bath for 12 hours at 50°. A test specimen of the reacton mixture will be completely soluble in cold water. The condensation product is obtained by evaporation of the mixture to dryness. The thus-obtained dyestuff, which corresponds to the formula

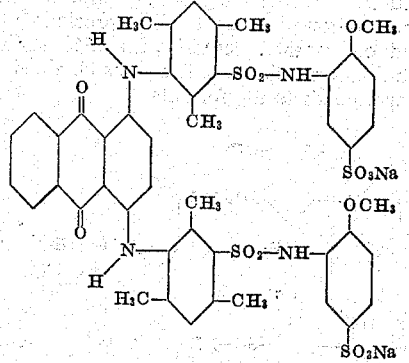

dyes wool, silk and nylon in reddish blue shades of good fastness to fulling and to light.

Similar dyestuffs are obtained when, while otherwise proceeding according to the preceding example, the disulfonic acid chloride from 47.4 parts of 1,4-di-(2',4',6'- trimethyl)-phenylaminoanthraquinone is replaced by the disulfonic acid chloride from 44.6 parts of 1,4-di-(2',6'-dimethyl)-phenylaminoanthraquinone or from 50.2 parts of 1,4-di-(2',3',4',6'-tetramethyl)-phenylaminoanthraquinone.

*Example 8*

100 parts of water and 13.0 parts of (4'-methoxy-3'-amino)-phenylmethanesulfonic acid are admixed with stirring, and the mixture is dissolved by running in 13.5 parts of 30% aqueous sodium hydroxide solution. To the resultant weakly alkaline-reacting solution, there are successively added 25.2 parts of crystalline sodium sulfate, 4.3 parts of sodium bicarbonate and the disulfonic acid chloride from 10.3 parts of 1,4-di-(2',6'-dimethyl)-phenylamino-6,7-dichloroanthraquinone. The mixture is then stirred for 24 hours at 50–55° and the formed dyestuff is precipitated with 20 parts of sodium chloride at 85°. This dyestuff, which corresponds to the formula

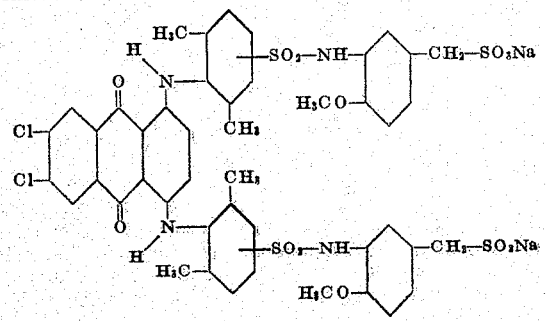

draws onto wool surprisingly slowly in pure blue shades; the dyestuff is distinguished by good fastness to fulling.

If, in the preceding paragraph, use is made of the disulfonic acid chloride from 9 parts of 1,4-di-(2',6'-dimethyl)-phenylaminoanthraquinone, a dyestuff is obtained which also draws slowly onto wool and is of good fulling fastness, but which produces reddish blue shades.

*Example 9*

To a suspension of the moist disulfonic acid chloride from 23.7 parts of 1,4-di-(2',4',6'-trimethyl)-phenylaminoanthraquinone in 100 parts of water, there are successively added, while stirring, 13 parts of sodium bicarbonate and a solution of 28.8 parts of 4-(4'-aminobenzoyl)-amino-2-hydroxybenzene-1-carboxylic acid in 100 parts of water and 15.4 parts of 30% aqueous sodium hydroxide solution, the mixture heated on the water-bath to 50–55° and stirring continued for 16 more hours. Finally, stirring is carried out for 1 hour at 90°, the reaction mixture then acidified with several drops of concentrated hydrochloric acid, the product precipitated by the addition of 50 parts of sodium chloride and the reaction mass allowed to cool. The precipitated product is filtered off, washed neutral with 15% sodium chloride solution and dried. The thus-obtained dyestuff, which corresponds to the formula

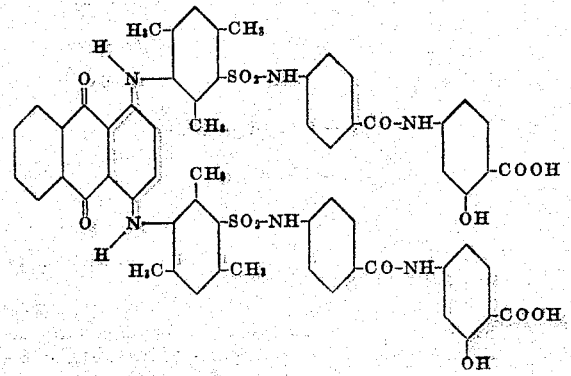

is characterized by good wet-fastness and light fastness properties, and dyes wool and silk in vivid pure blue shades.

*Example 10*

A slowly-drawing, reddish blue dyestuff which, in addition, possesses good fastness to fulling, is obtained by the following prescription:

The moist paste of the disulfonic acid chloride from 23.7 parts of 1,4-di-(2',4',6'-trimethyl)-phenylaminoanthraquinone is stirred into a solution of 11.5 parts of sodium bicarbonate in 100 parts of water, after which the sodium salt of 23.8 parts of 1-aminonaphthalene-5-sulfonic acid. After stirring for 15 hours at 55°, the reaction mixture will be water-soluble. The mixture is then heated to 80° and, while maintaining this temperature, 200 parts of saturated sodium chloride solution are added dropwise, the mixture stirred cold, and the formed dyestuff recovered after the manner of the previous examples. This dyestuff corresponds to the formula

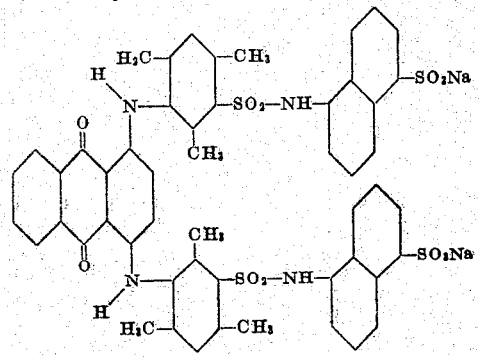

If, in the preceding paragraph, the sodium salt of 1-aminonaphthalene-5-sulfonic acid is replaced by the same amount of the sodium salt of 1-aminonaphthalene-7-sulfonic acid, a somewhat more reddish dyestuff with similar properties is obtained.

Instead of the 1-aminonaphthalene-7-sulfonic acid, use may be made with equal success of the sodium salt from 23.8 parts of the technical mixture of 1-aminonaphthalene-6-sulfonic acid and 1-aminonaphthalene-7-sulfonic acid.

*Example 11*

300 parts of moist disulfonic acid chloride from 44.6 parts of 1,4-di-(2',6'-dimethyl)-phenylaminoanthraquinone are admixed, while stirring, with 200 parts of technical amylamine, and the mixture then maintained at 52° for 12 hours. By pouring the mixture into a solution of 230 parts of concentrated hydrochloric acid in 800 parts of water at 25°, filtering, washing and drying the filtered-off product, there is obtained a reddish blue powder which, because of its good solubility, is excellently suited for use as a lacquer dyestuff. It corresponds to the formula

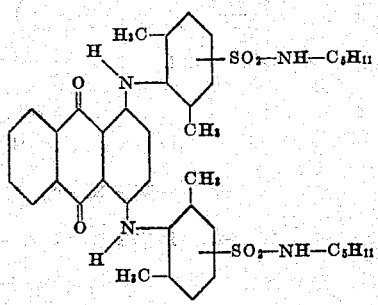

*Example 12*

To a mixture of 150 parts of monoethanolamine and 100 parts of isopropyl alcohol, there is added the moist paste of the disulfonic acid chloride from 47.4 parts of 1,4-di-(2',4',6'-trimethyl)-phenylaminoanthraquinone, and the mixture stirred for 10 hours at 48°. The water-insoluble reaction product is obtained by pouring the mixture into 1000 parts of water at 15°, filtering off the said product and washing it with water until it is free of excess monoethanolamine. After drying, there is obtained a blue powder which is useful as a lacquer and pigment dyestuff. The latter corresponds to the formula

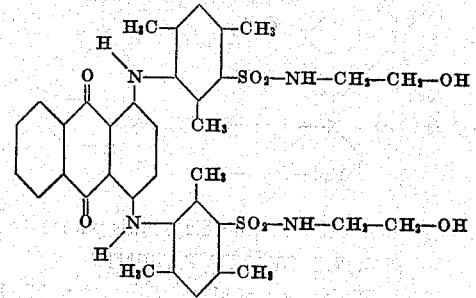

If the process of the preceding paragraph is carried out with the disulfonic acid chloride from 44.6 parts of 1,4-di-(2',6'-dimethyl)-phenylaminoanthraquinone, a reddish blue lacquer and pigment dyestuff is obtained.

If the process of the present example is carried out with the disulfonic acid chloride from 44.6 parts of 1,4-di-(2',6'-dimethyl)-phenylaminoanthraquinone and with 150 parts of diethanolamine (instead of monoethanolamine), a somewhat reddish blue dyestuff is obtained.

*Example 13*

By condensing the disulfonic acid chloride from 47.4 parts of 1,4-di-(2',4',6'-trimethyl)-phenylaminoanthraquinone with 200 parts of aminobenzene according to Example 11, there is obtained a reddish blue lacquer and pigment dyestuff which corresponds to the formula

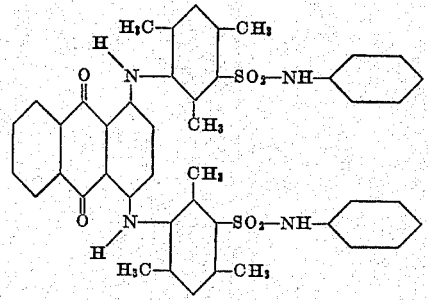

By replacing the aminobenzene by the same quantity of N-methylaminobenzene and reacting it with the disulfonic acid chloride from 47.4 parts of 1,4-di-(2',4',6'-trimethyl)-phenylaminoanthraquinone according to Example 11, a reddish blue lacquer and pigment dyestuff with similar properties is obtained.

A similarly good lacquer and pigment dyestuff is obtained by reacting the disulfonic acid chloride from 47.4 parts of 1,4-di-(2',4',6'-trimethyl)-phenylaminoanthraquinone with 200 parts of 1-amino-2,4-dimethylbenzene.

If the aminobenzene is reacted with the disulfonic acid chloride from 44.6 parts of 1,4-di-(2',6'-dimethyl)-phenylaminothraquinone instead of with the disulfonic acid chloride of 1,4-di-(2',4',6'-trimethyl)-phenylaminoanthraquinone, named in paragraph 1 of the present example, a somewhat more reddish blue lacquer and pigment dyestuff is obtained.

*Example 14*

100 parts of wool are entered at 40–50° into a dyebath containing 2 parts of the dyestuff according to the first paragraph of Example 1, 10 parts of sodium sulfate, 2 parts of formic acid and 6000 parts of water. The bath is then heated to boiling, boiled for 30 minutes and then cooled to approximately 70°, whereupon 2 more parts of formic acid are added and the bath again heated to boiling for 30 minutes. The wool is then rinsed and dried; it is dyed in vivid reddish blue shades.

Nylon and silk are dyed in very similar manner, except that with silk the bath is not boiled but heated only to 90–95°.

Having thus disclosed the invention, what is claimed is:

1. A sulfonic acid amide of the anthraquinone series, which corresponds to the formula

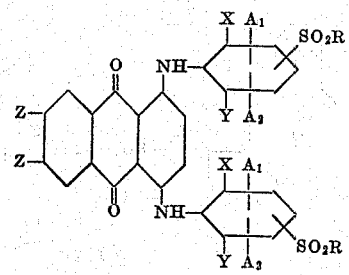

wherein each of X and Y stands for a member selected from the group consisting of methyl and ethyl, Z stands for a member selected from the group consisting of hydrogen, chlorine and bromine, $A_1$ stands for a member selected from the group consisting of hydrogen, methyl, ethyl, chlorine and bromine, $A_2$ stands for a member selected from the group consisting of hydrogen, methyl and ethyl, and R is the radical of an amine.

2. The sulfonic acid amide of the anthraquinone series which corresponds to the formula

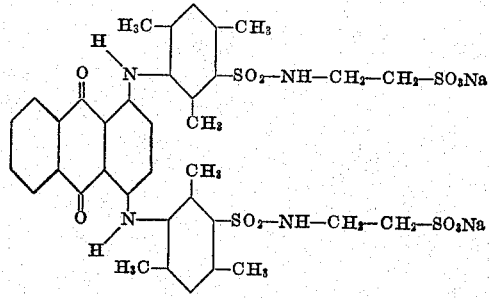

3. The sulfonic acid amide of the anthraquinone series, which corresponds to the formula

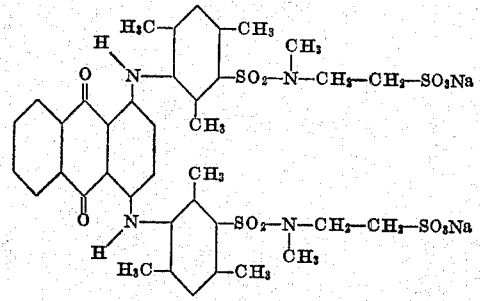

4. The sulfonic acid amide of the anthraquinone series, which corresponds to the formula

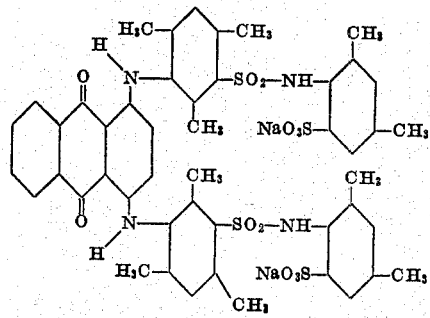

5. The sulfonic acid amide of the anthraquinone series, which corresponds to the formula
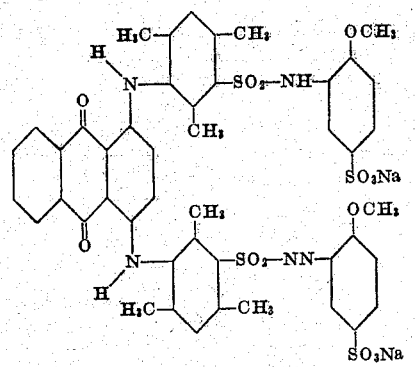
6. The sulfonic acid amide of the anthraquinone series, which corresponds to the formula
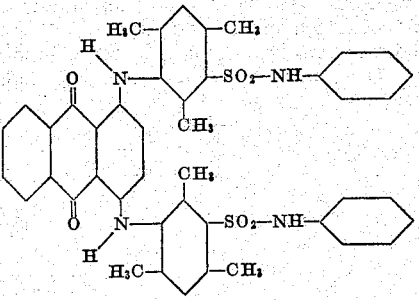
References Cited in the file of this patent
UNITED STATES PATENTS
| | | |
|---|---|---|
| 2,029,258 | Diefenbach et al. | Jan. 28, 1936 |
| 2,195,067 | Weinand et al. | Mar. 26, 1940 |
| 2,315,788 | Gutzwiller | Apr. 6, 1943 |
| 2,377,145 | Gutzwiller | May 29, 1945 |
FOREIGN PATENTS
| | | |
|---|---|---|
| 178,225 | Switzerland | Sept. 16, 1935 |